(12) United States Patent
Howe et al.

(10) Patent No.: US 12,240,541 B2
(45) Date of Patent: Mar. 4, 2025

(54) MODULAR TRACKED VEHICLE

(71) Applicant: Howe and Howe Inc., Waterboro, ME (US)

(72) Inventors: Michael Howe, Biddeford, ME (US); Forrest Joel Tripp, Saco, ME (US); Zachary Edward Sawyer, Alfred, ME (US); Anthony Victor Castro, Cape Elizabeth, ME (US)

(73) Assignee: Howe & Howe Inc., Waterboro, ME (US)

( * ) Notice: Subject to any disclaimer, the term of this patent is extended or adjusted under 35 U.S.C. 154(b) by 633 days.

(21) Appl. No.: 17/068,040

(22) Filed: Oct. 12, 2020

(65) Prior Publication Data
US 2021/0108895 A1 Apr. 15, 2021

Related U.S. Application Data

(60) Provisional application No. 62/914,165, filed on Oct. 11, 2019.

(51) Int. Cl.
 *B62D 55/06* (2006.01)
 *B62D 55/084* (2006.01)
 (Continued)

(52) U.S. Cl.
 CPC ........... *B62D 55/06* (2013.01); *B62D 55/084* (2013.01); *B62D 55/10* (2013.01); *B62D 55/13* (2013.01);
 (Continued)

(58) Field of Classification Search
 CPC ...... B62D 55/06; B62D 55/084; B62D 55/10; B62D 55/13; B62D 55/104; B62D 65/12;
 (Continued)

(56) References Cited

U.S. PATENT DOCUMENTS 2,352,086 A 6/1944 Eberhard
4,554,989 A * 11/1985 Gruich .................... B64C 27/82
 180/65.265

(Continued)

FOREIGN PATENT DOCUMENTS

DE 866319 2/1953
DE 102015000412 7/2016

(Continued)

OTHER PUBLICATIONS

Howe, Michael, et al.; "Vehicle With Deployable Towing Wheels and Suspension," U.S. Appl. No. 16/887,543, filed May 29, 2020.

*Primary Examiner* — Anne Marie M Boehler
(74) *Attorney, Agent, or Firm* — BainwoodHuang

(57) ABSTRACT

A technique for a modular tracked vehicle that can be reconfigured as needed to address different requirements and use cases. The modular tracked vehicle includes a chassis hull that allows interchangeable components to be connected thereto. The interchangeable components include interchangeable final drives which drive the vehicle's tracks. The chassis hull stores an energy reservoir, such as a battery or fuel tank, and the final drives include at least a gear box and drive axle. Different final drives may be provided for different torque levels, speed levels, energy sources, and or other specifications, and the final drives may be swapped based on mission requirements. Other components of the modular tracked vehicle may be interchangeable, as well. The technique may be provided, for example, as a modular tracked vehicle, a platform for a modular tracked vehicle, and/or as a method for use with a modular tracked vehicle.

20 Claims, 6 Drawing Sheets

(51) Int. Cl.
*B62D 55/10* (2006.01)
*B62D 55/13* (2006.01)
*B62D 63/02* (2006.01)
*F41H 7/04* (2006.01)
*B62D 55/104* (2006.01)

(52) U.S. Cl.
CPC ........... *B62D 63/025* (2013.01); *F41H 7/048* (2013.01); *B62D 55/104* (2013.01); *F41H 7/042* (2013.01); *F41H 7/044* (2013.01)

(58) Field of Classification Search
CPC ...... B62D 65/32; B62D 65/04; B62D 63/025; B62D 49/0678; F41H 7/042; F41H 7/044; F41H 7/048; B60G 2206/11
See application file for complete search history.

(56) References Cited

U.S. PATENT DOCUMENTS

| | | | |
|---|---|---|---|
| 4,591,347 A * | 5/1986 | Goldfarb | A63H 31/00 446/484 |
| 5,934,397 A * | 8/1999 | Schaper | B62D 63/025 180/65.245 |
| 6,113,343 A * | 9/2000 | Goldenberg | B25J 19/005 239/587.2 |
| 7,648,170 B2 * | 1/2010 | Geslin | B60G 7/02 280/785 |
| 8,201,649 B2 * | 6/2012 | Andrus | F41H 7/005 180/9.1 |
| 8,474,554 B2 | 7/2013 | Howe et al. | |
| 9,873,468 B2 | 1/2018 | Howe et al. | |
| 10,407,931 B2 * | 9/2019 | Zerweck | E04H 4/1654 |
| 10,745,065 B2 | 8/2020 | Howe et al. | |
| 10,814,889 B2 * | 10/2020 | Looney | B61C 13/00 |
| 2005/0284682 A1 * | 12/2005 | Hass | F41H 7/048 180/242 |
| 2006/0237239 A1 * | 10/2006 | Bruner | B62D 55/12 180/9.1 |
| 2008/0236376 A1 * | 10/2008 | Reeves | F41H 11/30 89/1.13 |
| 2009/0250276 A1 * | 10/2009 | Goodwin | B60L 15/20 180/65.265 |
| 2010/0236844 A1 | 9/2010 | Howe et al. | |
| 2012/0181100 A1 * | 7/2012 | Halliday | F41H 1/02 89/930 |
| 2014/0216238 A1 * | 8/2014 | Pfennig | F41H 5/02 89/36.02 |
| 2014/0288763 A1 * | 9/2014 | Bennett | B62D 11/18 180/9.5 |
| 2016/0096563 A1 | 4/2016 | Tigue et al. | |
| 2017/0253271 A1 * | 9/2017 | Bertezzolo | B62D 21/12 |
| 2019/0105977 A1 * | 4/2019 | Biermann | B60K 7/0007 |
| 2020/0023916 A1 * | 1/2020 | Mackarvich | F41H 7/044 |
| 2022/0348275 A1 * | 11/2022 | Harmon | B60K 1/04 |
| 2022/0348277 A1 * | 11/2022 | Harmon | B62D 65/04 |

FOREIGN PATENT DOCUMENTS

| | | | | |
|---|---|---|---|---|
| EP | 1564518 | | 8/2005 | |
| WO | 9832622 | | 7/1998 | |
| WO | WO-2012117204 A1 * | 9/2012 | | B60G 3/20 |
| WO | 2013010110 | | 1/2013 | |
| WO | WO-2020109498 A1 * | 6/2020 | | B60K 1/00 |

* cited by examiner

MODULAR TRACKED VEHICLE

BACKGROUND

Tracked vehicles find common usage in off-road, recreational, forestry, and military applications. A typical tracked vehicle includes a chassis and a pair of track assemblies affixed to the chassis. The chassis may contain a fuel tank or battery, an engine or motor, a transmission, a hydraulic brake system, and a drive train for transmitting power to a pair of sprockets in the respective track assemblies. Rotating the sprockets forward and back causes the tracks to advance forward and back.

Tracked vehicles may be manned or unmanned. In addition, tracked vehicles may be optimized for particular applications. For example, the SMET vehicle, available from Howe & Howe, Inc. of Waterboro, Me., is a robotic vehicle optimized for carrying cargo, whereas the Ripsaw vehicle, also available from Howe & Howe, Inc., is optimized for recreational use.

SUMMARY

Unfortunately, conventional tracked vehicles tend to have fixed designs that are difficult to adapt for different configurations and use cases. For example, a tracked vehicle designed for light-duty use is difficult to adapt for heavy-duty use, and vice-versa. Likewise, a tracked vehicle designed for high-torque operation is difficult to adapt for high-speed operation. In general, conventional tracked vehicles tend to be designed with particular applications in mind and cannot easily be adapted for other applications.

In contrast with prior designs, an improved technique provides a modular tracked vehicle that can be reconfigured as needed to address different requirements and use cases. The modular tracked vehicle includes a chassis hull that allows interchangeable components to be connected thereto. The interchangeable components include interchangeable final drives which drive the vehicle's tracks. The chassis hull stores an energy reservoir, such as a battery or fuel tank, and the final drives include at least a gear box and drive axle. Different final drives may be provided for different torque levels, speed levels, energy sources, and/or other specifications, and the final drives may be swapped based on mission requirements.

Certain embodiments are directed to a modular tracked vehicle that includes a chassis hull having a first end, a second end, a left side, a right side, and a top surface. The chassis hull is configured to contain an energy reservoir. The modular tracked vehicle further includes a first final drive coupled to the first end of the chassis hull. The first final drive includes an enclosure that at least partially contains a gear box and at least one drive axle configured to drive first and second drive sprockets for propelling the modular tracked vehicle. The first final drive is constructed and arranged to detach from the chassis hull and be replaced with a second final drive having different components from those of the first final drive.

Other embodiments are directed to a method of providing a modular tracked vehicle. The method includes providing a chassis hull having a first end, a second end, a left side, a right side, and a top surface. The chassis hull is configured to contain an energy reservoir. The method further includes attaching a first final drive to the first end of the chassis hull. The first final drive includes an enclosure that at least partially contains a gear box and at least one drive axle configured to drive first and second drive sprockets for propelling the modular tracked vehicle. The method still further includes replacing the first final drive with a second final drive having different components from those of the first final drive.

Still other embodiments are directed to a platform for a modular tracked vehicle. The platform includes a chassis hull having a first end, a second end, a left side, a right side, and a top surface. The chassis hull is configured to contain an energy reservoir. The first end of the chassis hull is adapted to attach to a first final drive that includes an enclosure that at least partially contains a gear box and at least one drive axle configured to drive first and second drive sprockets for propelling the modular tracked vehicle. The chassis hull is constructed and arranged to detach from the first final drive and to attach instead to a second final drive having different components from those of the first final drive.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique provides a modular tracked vehicle that can be reconfigured as needed to address different requirements and use cases. The modular tracked vehicle includes a chassis hull capable of connecting to interchangeable components. For example, the chassis hull may be connected to a variety of interchangeable final drives for accommodating various torque, speed, and/or drive-type requirements. Likewise, the chassis hull may be connected to a variety of interchangeable nose pieces and/or top-mount assemblies, optimized for performing various functions. It may also be connected to a variety of interchangeable suspension carriers, e.g., for supporting light-duty or heavy-duty requirements, or for addressing other mission-specific requirements.

Figure 1:
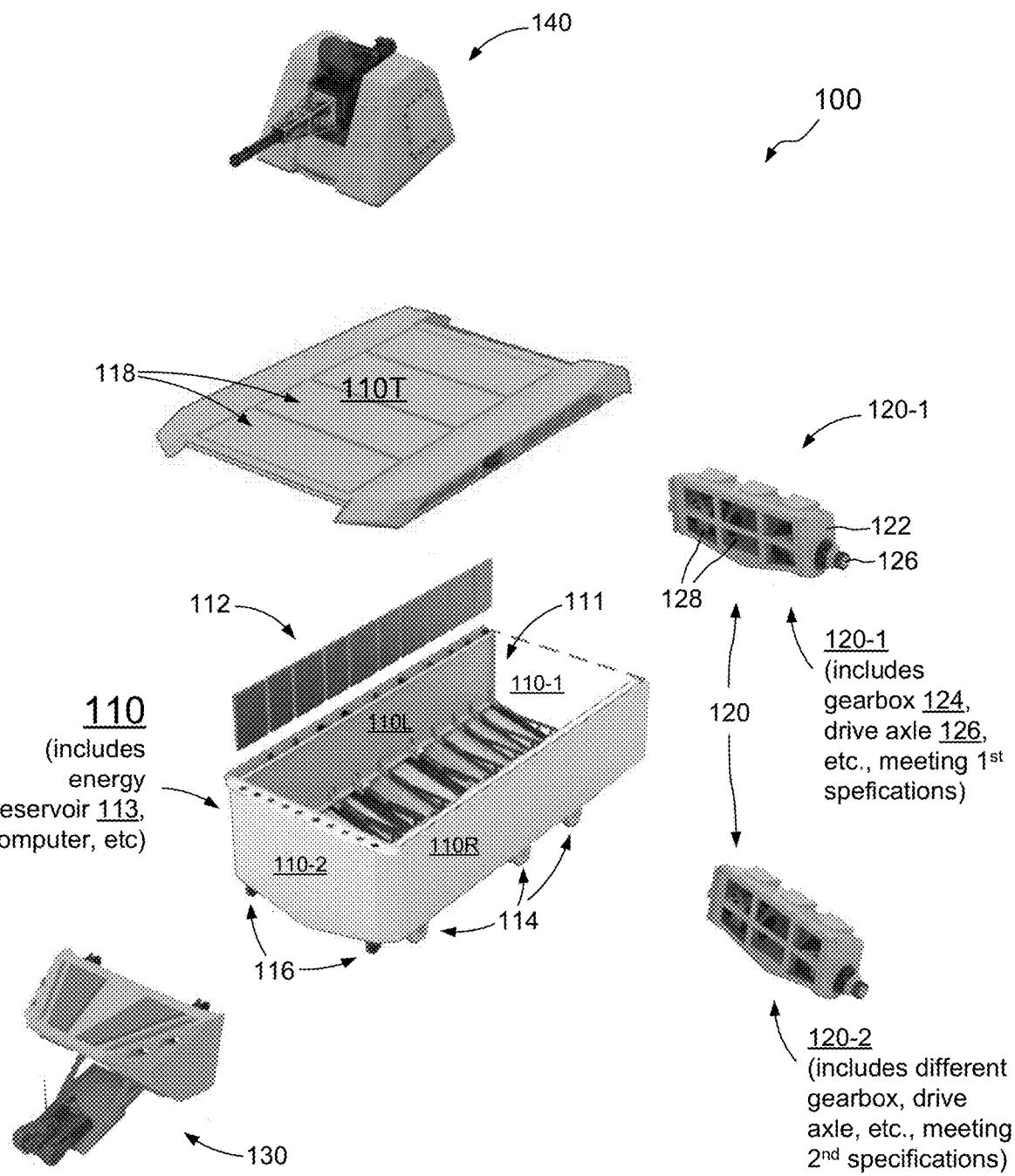
FIG. 1 is an exploded view of parts of an example modular tracked vehicle in accordance with certain embodiments.

FIG. 1 shows an exploded view of portions of an example modular tracked vehicle 100. As shown, a chassis hull 110 provides a platform configured to attach to various interchangeable components. The chassis hull 110 has a first end 110-1 and a second end 110-2. It also has a left side 110L and a right side 110R, as well as a top surface 110T. In some examples, the first end 110-1 may be open or partially open. Optionally, the left and right sides 110L and 110R are provisioned with armor plates 112, which may be inserted into slots or channels in the respective sides for providing additional protection. The armor plates 112 may be composed of steel or some other impact-resistant material. The chassis hull 110 may further include side attachment points 114, e.g., for connecting to idler wheels or other portions of a track assembly, and front attachment points 116, e.g., for attaching to a nose piece, such as nose piece 130.

In some examples, the top surface 110T includes removable panels 118 (four panels shown), which provide access to an inside of the chassis hull 110 when the top is attached. Attachment of the top surface 110T may be achieved using bolts or by welding, for example. One or more of the panels 118 may be removed to accommodate certain top-mount assemblies, e.g., those requiring space below their mounting surfaces. An example top-mount assembly 140 is shown.

As further shown, the chassis hull 110 includes an internal region 111, which is suitable for housing large and/or heavy components of the vehicle, as well as those that require protection from the environment. Depending on implementation, these may include an energy reservoir 113, such as a fuel tank (e.g., diesel or gasoline tank, for liquid fuel and hybrid systems), one or more batteries (for liquid fuel, hybrid, and electric drive systems), a diesel or gasoline engine, a transmission, a hydraulic system, e.g., for brakes and other mechanical systems, a cooling system (e.g., radiator(s) and cooling fluid), one or more computers and/or other electronics, and a cargo hold. Although the internal region 111 is shown as one large space, it may in some examples be provided as multiple compartments.

The chassis hull 110 is configured to attach to interchangeable final drives 120, such as final drives 120-1 and 120-2. Each final drive 120 includes an enclosure 122 that at least partially contains a gearbox 124 and at least one drive axle 126, which is configured to rotate sprockets that engage tracks for propelling the vehicle 100. For example, separate left and right drive axles may be provided, or a single drive axle may be provided that extends left and right. The enclosure 122 may include apertures 128 that allow power and control to pass between the chassis hull 110 and the final drive 120, for communicating power and control to the final drive 120. In some examples, the apertures 128 also allow for feedback to the chassis hull 110, e.g., from sensors in the final drive 120. The term "power and control lines" is intended to cover mechanical lines, such as drive shafts and other couplings, hydraulic lines (e.g., for brakes), electrical lines (e.g., for conveying power from one or more batteries), electronic control lines, feedback lines, and the like. Also, the term "gearbox" is intended broadly to cover differential gears, e.g., for translating rotation of a drive shaft into rotation of the drive axle(s) 126, as well as gears found within electric motors and other gears.

Depending on design, a final drive 120 may further include brakes, additional mechanical couplings, and other components, and different final drives 120 may have different components and specifications. For example, final drive 120-1 may include components adapted for high-torque operation, such as heavy-duty gears and/or axles, whereas final drive 120-2 may include components adapted for high-speed operation, such as lighter-weight gears and/or axles. Some final drives 120 may include components adapted for electric drive, such as cabling, inverters, and electric motors, whereas other final drives 120 may include components adapted for diesel or gasoline power, such as a coupling to a drive shaft that extends from an engine in the chassis hull 110. In some arrangements, a diesel or gasoline engine may itself be provided within a final drive (although the chassis hull 110 may be the more optimal location considering size and weight distribution).

In operation, the vehicle 100 may initially be configured with final drive 110-1, which may be suitable for a first mission, but may later be reconfigured with final drive 110-2, which may be more suitable for a second mission. Reconfiguring the vehicle 100 may involve, for example, detaching the final drive 120-1 from the chassis hull 110, disconnecting power and control lines from the final drive 120-1, reconnecting power and control lines to the final drive 120-2 (or using different power and control lines, as needed), and attaching the final drive 120-2 to the chassis hull 110.

In some examples, a computer within the chassis hull 110 associates different configurations with different profiles. For example, there may be a high-torque profile, which effects a certain manner of controlling batteries and motors, and a high-speed profile, which effects different control of batteries and motors. In some cases, changeover may be more extensive, with electric power being replaced by liquid-fuel power, or vice-versa. In such cases, additional changes may be made within the chassis hull 110. In some examples, the changeover may further involve the use of a different top-mount assembly, nose piece, and/or suspension carrier.

Figure 2A:
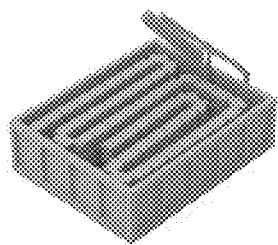
FIGS. 2A-2E are perspective views of a variety of interchangeable top-mount assemblies that may be used in the modular tracked vehicle of FIG. 1.
Figure 2B:
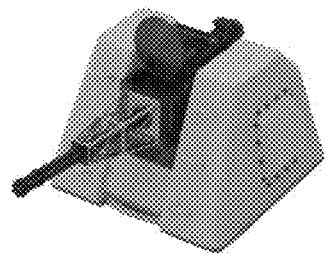
Figure 2C:
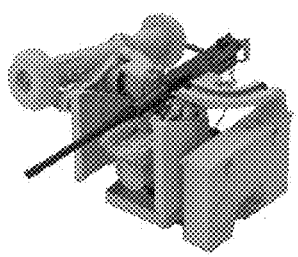
Figure 2D:
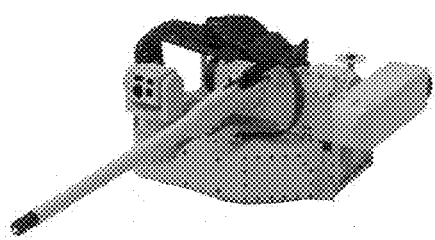
Figure 2E:
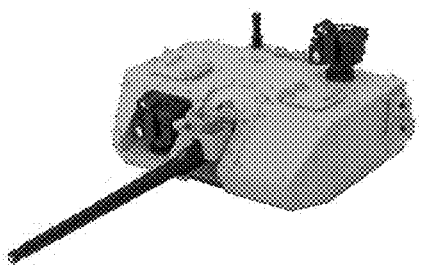

FIGS. 2A-2E show examples of interchangeable top-mount assemblies 140 which may be used in various configurations of the modular tracked vehicle 100. These include a MICLIC (Mine Clearing Line Charge) as shown in FIG. 2A, as well as various weapons and anti-aircraft systems, as shown in FIGS. 2B-2E. They may also include a vertically-extendible camera system, an UAV (unmanned aerial vehicle) platform, and a scissors lift. These are merely examples, however. The top-mount assemblies 140 may be attached directly to the top surface 110T of the chassis hull 110. For example, the top surface may include a bolt grid or other hole pattern, which allows the top-mount assemblies 140 to be directly bolted to the top surface 110T. Some top-mount assemblies 140 may require removal of one or more panels 118. In some examples, the top surface 110T includes one or more pass-through apertures (not shown) that allow power and/or control lines to pass between the top-mount assembly 140 and the internal region 111 of the chassis hull 110.

Figure 3A:
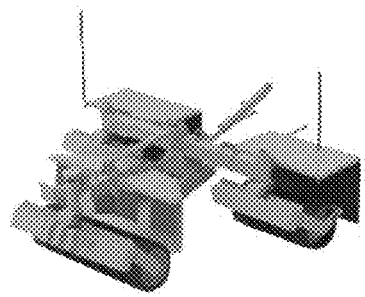
FIGS. 3A-3D are perspective views of a variety of interchangeable nose pieces that may be used in the modular tracked vehicle of FIG. 1.
Figure 3B:
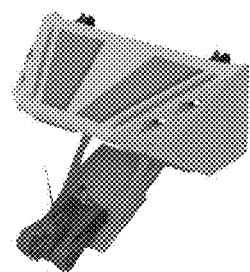
Figure 3C:
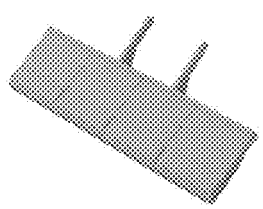
Figure 3D:
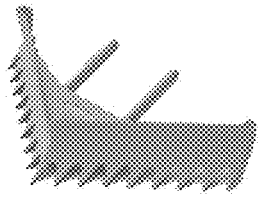

FIGS. 3A-3C show examples of interchangeable nose pieces 130 which may be used in various configurations of the vehicle 100. These include an IED (improvised explosive device) defeat roller (FIG. 3A), a marsupial UGV (unmanned ground vehicle) ramp (FIG. 3B), a ground-penetrating radar (FIG. 3C), and a mine plow (FIG. 3D). The interchangeable nose pieces 130, or certain ones of them, have the characteristic that they provide an appearance of being integral with the chassis hull 110, and thus with the vehicle 100, when attached to the chassis hull 110. For example, the second end 110-2 of the chassis hull 110 may be substantially flat, such that a nose piece 130 sits flush with the second end 110-2 and appears to be part of the vehicle 100, rather than appearing to be attached to the front of the vehicle, as would be the case, for example, with a plough attached to the front of a pick-up truck.

Figure 4:
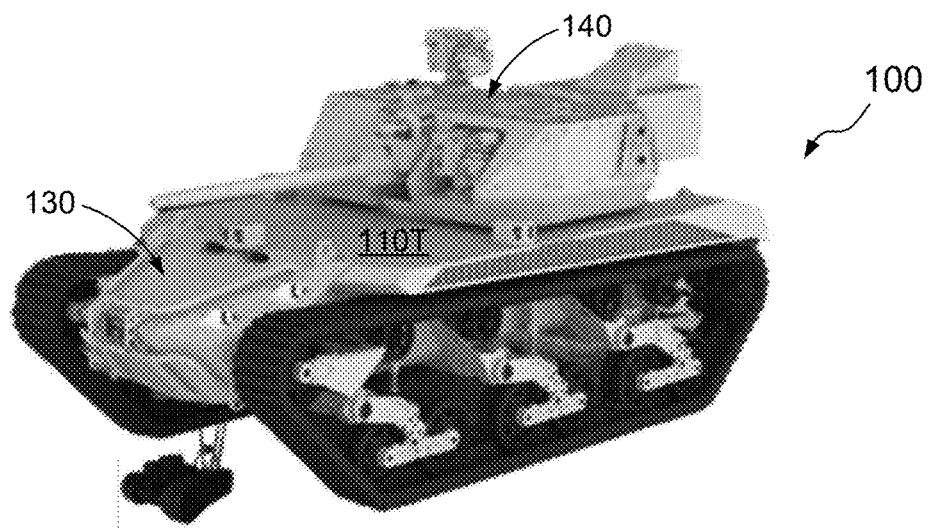
FIG. 4 is a perspective view of an example modular tracked vehicle in fully assembled form.

For instance, FIG. 4 shows an example of an assembled modular vehicle 100, with a particular nose piece 130 (marsupial UGV ramp, shown with the UGV deployed). It can be seen that the nose piece 130 gives the appearance of being integral with the chassis hull 110.

Figure 5A:
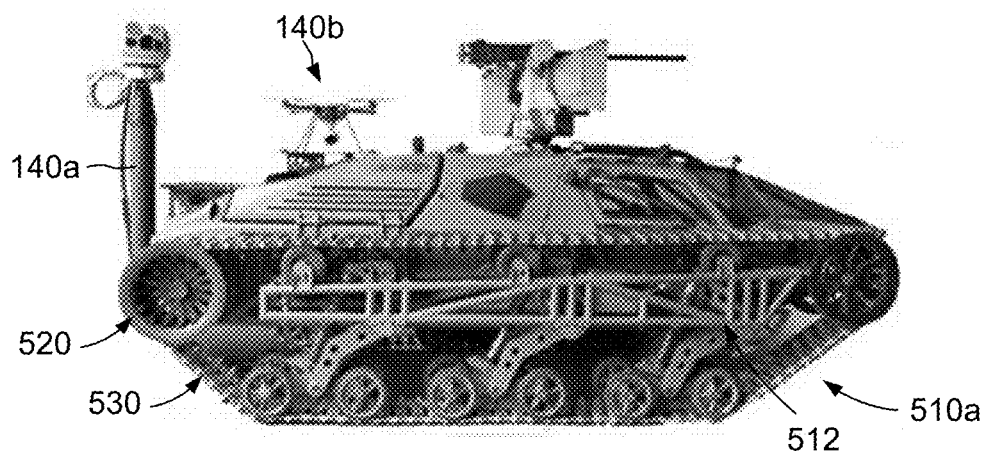
FIGS. 5A-5C are perspective views of various interchangeable suspension carriers that may be used in the modular tracked vehicle of FIG. 1.
Figure 5B:
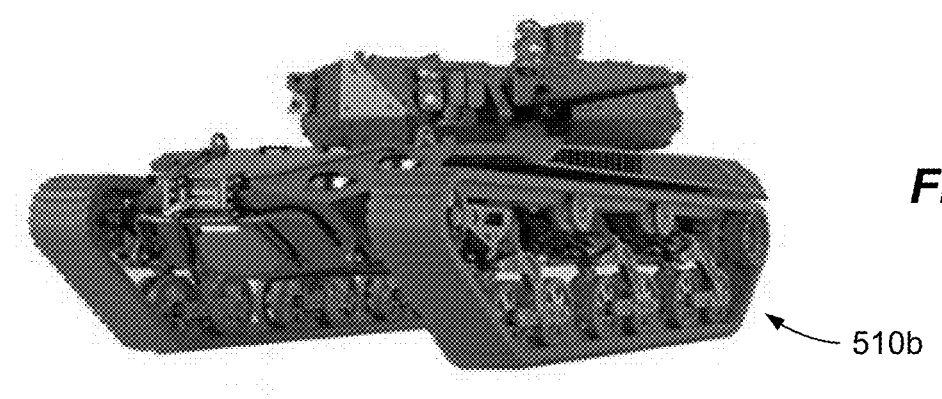
Figure 5C:
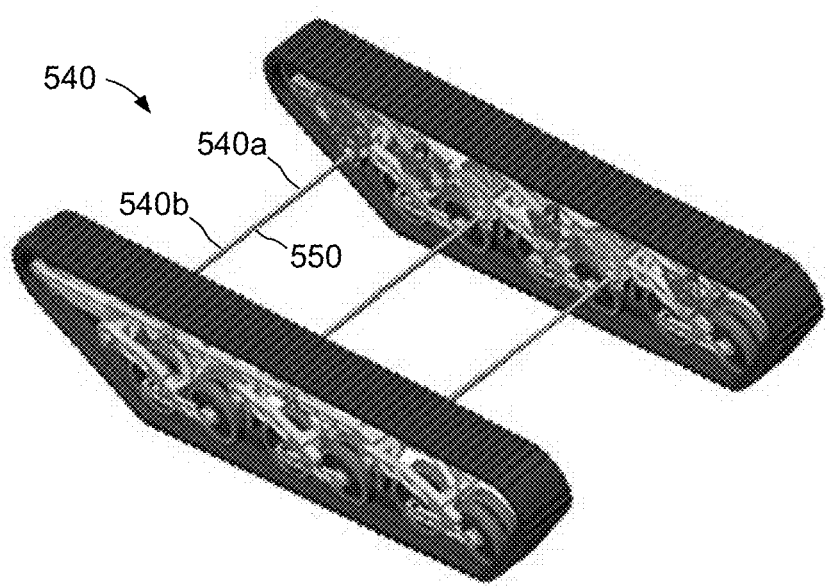

FIGS. 5A-5C show various views of interchangeable suspension carriers, which may be used in connection with the chassis hull 110 of FIG. 1. For example, FIG. 5A shows a modular tracked vehicle 100 equipped with a heavy-duty suspension carrier 510a, which includes an exoskeleton region 512. In contrast, FIG. 5B shows a modular tracked vehicle 100 equipped with a lighter-duty suspension carrier 510b, which includes no exoskeleton region. Both suspension carriers 510a and 510b are configured to attach removably to the sides 110R and 110L of the chassis hull 110, e.g., using bolts or other fasteners, and may be exchanged by detaching one and attaching the other.

It is noted that FIG. 5A shows examples of top-mount assemblies 140 not shown previously, such as a vertically extendable camera system 140a and a UAV platform 140b (with UAV attached). FIG. 5A further shows an example drive sprocket 520. Typically, the modular tracked vehicle 100 includes left and right drive sprockets 520, which are coupled to respective drive axles 126 (or to respective ends of a single drive axle) for propelling the vehicle 100. For example, the sprockets 520 include ridges or splines that engage tracks 530 on both side of the vehicle, such that rotating the sprockets one way or the other effects movement of the tracks forward or back.

In some examples, swapping suspension carriers 510a and 510b involves swapping torsion bars used to provide spring resistance for the suspension carriers. As shown in FIG. 5C, torsion bars 540 connect between suspension carriers and fixed center points 550. Each torsion bar 540 (540a or 540b) attaches to a portion of a suspension carrier at one end, where it is free to rotate in relation to the suspension going through its travel, and to a central fixation point 550 within the chassis hull 110 at the other end, where it is prevented from rotating. The torsion bars 540 thus provide spring resistance for biasing the suspension. Different torsion bars may be used for different applications, depending, for example, on the weight of the vehicle 100, on expected terrain, and on other factors.

Figure 6:
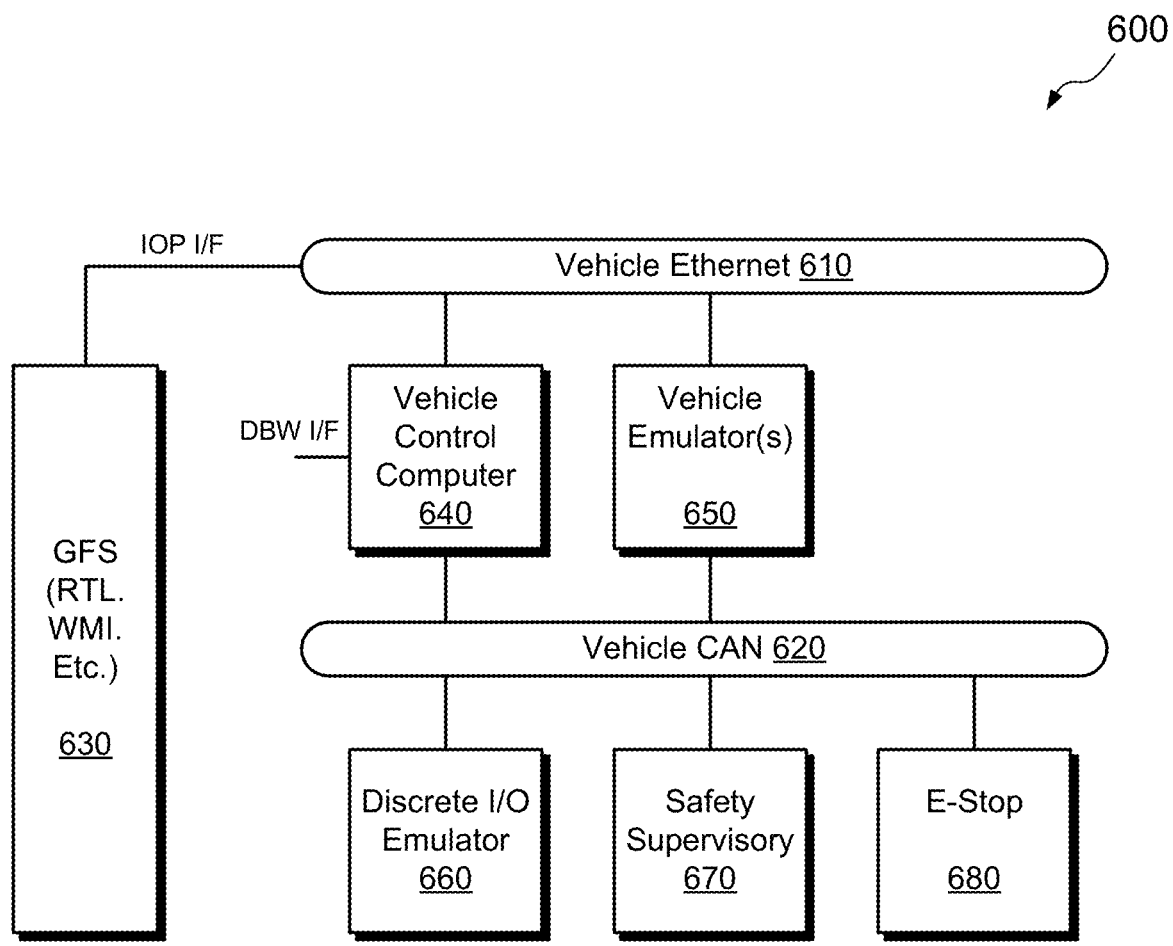
FIG. 6 is a block diagram of an example electronic system that may be implemented in the modular tracked vehicle of FIG. 1.

FIG. 6 shows an example electronic system 600 that may be used in connection with the modular vehicle 100. In an example, the electronic system 600 has a modular design, in which different electronic and/or software components may be used with different configurations.

As shown, the electronic system 600 includes a vehicle Ethernet 610 for supporting a local area network (LAN) within the vehicle 100. In some examples, the Ethernet 610 also provides wireless functionality, e.g., to allow for remote control operation of the vehicle 100. The electronic system 600 may also include a vehicle CAN 620 (controller area network) for supporting communications among components of the vehicle 100. In some examples, a GFS (ground-fire support) component, such as RTL (Radio Team Leader), WFI (warfire machine interface), or the like is disposed in communication with a vehicle control computer 640 (also referred to herein as a "computer" or "computing device") and one or more vehicle emulators 650. The computer 640 may also receive input from a DBW (data bus wire) interface. The emulators 650 may include vendor-specific emulators, which may be provided by third parties to allow their equipment, such as top-mount assemblies 140 and other equipment, to be integrated into the vehicle 100 and may allow for simulation of mission scenarios in advance of deployment. The computer 640 and vehicle emulator(s) 640 may also be coupled to the vehicle CAN 620, which may be further coupled to a discrete I/O emulator 660 (e.g., for simulating inputs and outputs associated with various vehicle scenarios), a safety supervisory system 670, and an emergency stop system 680.

In the manner shown, the electronic system 600 provides a software platform for integrating third party hardware and functionality, as well as that developed internally. The vehicle 100 may thus also be modular electronically and functionally, as well as mechanically.

Figure 7:
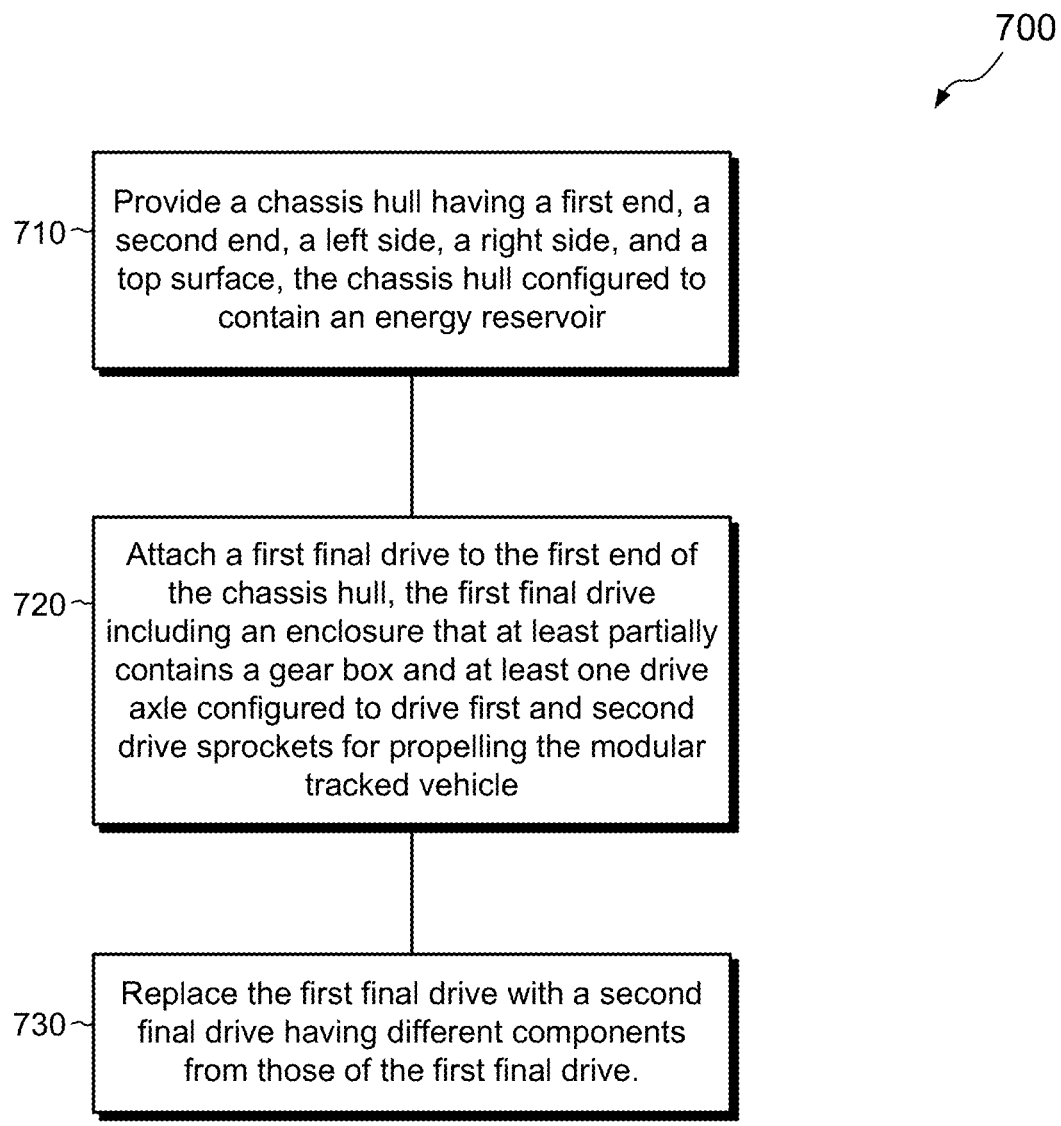
FIG. 7 is a flowchart showing an example method for providing a modular tracked vehicle in accordance with certain embodiments.

FIG. 7 shows an example method 700 that may be performed in connection with the modular tracked vehicle 100. At act 710, a chassis hull 110 is provided. The chassis hull 110 includes a first end 110-1, a second end 110-2, a left side 110L, a right side 110R, and a top surface 110T. The chassis hull 110 is configured to contain an energy reservoir 113, such as a liquid fuel tank and/or one or more batteries. It may also include other components in various examples, such as an engine, transmission, hydraulics, cooling system, cargo hold, and the like, as described in connection with FIG. 1.

At 720, a first final drive 120-1 is attached to the first end 110-1 of the chassis hull 110. The first final drive 120-1 includes an enclosure 122 that at least partially contains a gear box 124 and at least one drive axle 126, which is configured to drive first and second drive sprockets 520 for propelling the tracked vehicle 100. The first final drive 120-1 may include additional components, such as brakes, electric motors (for electric drive), and the like, as described above in connection with FIG. 1. Act 720 may further involve attaching or otherwise providing power and control lines between the chassis hull 110 and the first final drive 120-1.

At 730, the first final drive 120-1 is replaced with a second final drive 120-2 having different components from those of the first final drive 120-1. For example, the second final drive 120-2 may include heavier or lighter-duty components than the first final drive 120-1. It may also include components for a different type of drive system (fuel, hybrid, or fully-electric, for example). In some examples, act 730 may further involve detaching power and control lines previously provided between the chassis hull 110 and the first final drive 120-1, and attaching or otherwise providing power and control lines between the chassis hull 110 and the second final drive 120-1. Some or all of the power and control lines used with the first final drive 120-1 may also be used with the second final drive 120-2, but this is not required.

In addition to exchanging final drives 120, the method 600 may further include replacing a current nose piece 130, top-mount assembly 140, and/or suspension carrier 510. It may further involve replacing or enabling different software modules (FIG. 6).

An improved technique has been described for providing a modular tracked vehicle 100 that can be reconfigured as needed to address different requirements and use cases. The modular tracked vehicle 100 includes a chassis hull 110 that allows interchangeable components to be connected thereto. The interchangeable components include interchangeable final drives 120 which drive the vehicle's tracks 530. The chassis hull 100 stores an energy reservoir 113, such as a battery or fuel tank, and the final drives include at least a gear box 124 and drive axle 126. Different final drives 120 may be provided for different torque levels, speed levels, energy sources, and/or other specifications, and the final drives 120 may be swapped based on mission requirements.

Having described certain embodiments, numerous alternative embodiments or variations can be made. For example, other components may be swapped to address mission requirements besides final drives 120, nose pieces 130, top-mount assemblies 140, and suspension carriers 510. Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of providing a modular tracked vehicle, comprising:
providing a chassis hull having a first end, a second end, a left side, a right side, and a top surface, the chassis hull configured to contain an energy reservoir;
attaching a first final drive end-to-end to the first end of the chassis hull outside of the chassis hull, the first final drive including an enclosure that at least partially contains a gear box and at least one drive axle configured to drive first and second drive sprockets for propelling the modular tracked vehicle, the first final drive being a module configured for high-torque operation,
replacing the first final drive with a second final drive having different components from those of the first final drive, the second final drive being a module configured for high-speed operation.

2. The method of claim 1, wherein the first final drive has a rear surface that abuts the first end of the chassis hull when the first final drive is attached to the chassis hull, the rear surface of the first final drive having a set of apertures through which first power and control lines are passed for applying power and control to the first final drive, and wherein replacing the first final drive with the second final drive includes:
detaching the first power and control lines passed through the set of apertures of the first final drive; and
passing second power and control lines through a set of apertures in the second final drive for applying power and control to the second final drive, the second power and control lines differing at least in part from the first power and control lines.

3. The method of claim 2, wherein the second end of the chassis hull is attached to a first nose piece that sits flush with the second end of the chassis hull and provides an appearance of being integral with the chassis hull, and wherein the method further comprises replacing the first nose piece with a second nose piece that sits flush with the second end of the chassis hull and provides the appearance of being integral with the chassis hull.

4. The method of claim 3, further comprising communicating between a computing device disposed within the chassis hull and the first nose piece to control a function of the first nose piece, said communicating conducted over a communication channel that extends between the chassis hull and the first nose piece.

5. The method of claim 2, wherein the top surface of the chassis hull is attached to a first top-mount assembly, and wherein the method further comprises replacing the first top-mount assembly with a second top-mount assembly having different characteristics from those of the first top-mount assembly.

6. The method of claim 5, further comprising communicating between a computing device disposed within the chassis hull and the first top-mount assembly to control a function of the first top-mount assembly, said communicating conducted over a communication channel that extends between the chassis hull and the first top-mount assembly.

7. The method of claim 2, wherein the left and right sides of the chassis hull are coupled to respective suspension carriers having first components, and wherein the method further comprises replacing the suspension carriers having the first components with suspension carriers having second components that differ from the first components.

8. A method of providing a modular tracked vehicle, comprising:
providing a chassis hull having a first end, a second end, a left side, a right side, and a top surface, the chassis hull configured to contain a set of batteries;
attaching a first final drive end-to-end to the first end of the chassis hull outside of the chassis hull, the first final drive including an enclosure that at least partially contains an electric motor, a gear box, and at least one drive axle configured to drive first and second drive sprockets for propelling the modular tracked vehicle, the first final drive being a module configured for high-torque operation, replacing the first final drive with a second final drive having different components from those of the first final drive, the second final drive being a module configured for high-speed operation.

9. The method of claim 8, wherein replacing the first final drive with the second final drive includes:
disconnecting electrical cabling between the set of batteries in the chassis hull and the electric motor of the first drive; and
connecting the electrical cabling between the set of batteries in the chassis hull and an electric motor of the second drive.

10. The method of claim 8, wherein the first final drive has a rear surface that abuts the first end of the chassis hull when the first final drive is attached to the chassis hull, the rear surface of the first final drive having a set of apertures through which first power and control lines are passed for applying power and control to the first final drive, and wherein replacing the first final drive with the second final drive includes:
detaching the first power and control lines passed through the set of apertures of the first final drive; and
passing second power and control lines through a set of apertures in the second final drive for applying power and control to the second final drive, the second power and control lines differing at least in part from the first power and control lines.

11. The method of claim 8, wherein the second end of the chassis hull is attached to a first nose piece that sits flush with the second end of the chassis hull and provides an appearance of being integral with the chassis hull, and wherein the method further comprises replacing the first nose piece with a second nose piece that sits flush with the second end of the chassis hull and provides the appearance of being integral with the chassis hull.

12. The method of claim 11, further comprising communicating between a computing device disposed within the chassis hull and the first nose piece to control a function of the first nose piece, said communicating conducted over a communication channel that extends between the chassis hull and the first nose piece.

13. The method of claim 11, wherein replacing the first nose piece with a second nose piece includes replacing the first nose piece with any of:
an IED (improvised explosive device) defeat roller;
a marsupial UGV (unmanned ground vehicle) ramp;
a ground-penetrating radar; and
a mine plow.

14. The method of claim 8, wherein the top surface of the chassis hull is attached to a first top-mount assembly, and wherein the method further comprises replacing the first top-mount assembly with a second top-mount assembly having different characteristics from those of the first top-mount assembly.

15. The method of claim 14, further comprising communicating between a computing device disposed within the chassis hull and the first top-mount assembly to control a function of the first top-mount assembly, said communicating conducted over a communication channel that extends between the chassis hull and the first top-mount assembly.

16. The method of claim 14, wherein replacing the first top-mount assembly with a second top-mount assembly includes replacing the first top-mount assembly with any of:
a MICLIC (Mine Clearing Line Charge);
an anti-aircraft gun;
a remote controlled weapon station;
a vertically-extendable camera system;
a UAV (unmanned aerial vehicle) platform; and
a scissor lift.

17. The method of claim 8, wherein the left and right sides of the chassis hull are coupled to respective suspension carriers having first components, and wherein the method further comprises replacing the suspension carriers having the first components with suspension carriers having second components that differ from the first components.

18. A method of providing a modular tracked vehicle, comprising:
providing a chassis hull having a first end, a second end, a left side, a right side, and a top surface, the chassis hull configured to contain a liquid fuel tank and a liquid-fuel engine;
attaching a first final drive end-to-end to the first end of the chassis hull outside of the chassis hull, the first final drive including an enclosure that at least partially contains a gear box and at least one drive axle configured to drive first and second drive sprockets for propelling the modular tracked vehicle, the first final drive being a module configured for high-torque operation,
replacing the first final drive with a second final drive having different components from those of the first final drive, the second final drive being a module configured for high-speed operation.

19. The method of claim 18, wherein the first final drive has a rear surface that abuts the first end of the chassis hull when the first final drive is attached to the chassis hull, the rear surface of the first final drive having a set of apertures through which first power and control lines are passed for applying power and control to the first final drive, and wherein replacing the first final drive with the second final drive includes:
detaching the first power and control lines passed through the set of apertures of the first final drive; and
passing second power and control lines through a set of apertures in the second final drive for applying power and control to the second final drive, the second power and control lines differing at least in part from the first power and control lines.

20. The method of claim 18, wherein the left and right sides of the chassis hull are coupled to respective suspension carriers having first components, and wherein the method further comprises replacing the suspension carriers having the first components with suspension carriers having second components that differ from the first components.

* * * * *